(12) United States Patent
Raposo

(10) Patent No.: US 8,992,346 B1
(45) Date of Patent: *Mar. 31, 2015

(54) METHOD AND SYSTEM FOR SWING ANALYSIS

(71) Applicant: Callaway Golf Company, Carlsbad, CA (US)

(72) Inventor: Mario Raposo, Carlsbad, CA (US)

(73) Assignee: Callaway Golf Company, Carlsbad, CA (US)

(*) Notice: Subject to any disclaimer, the term of this patent is extended or adjusted under 35 U.S.C. 154(b) by 18 days.

This patent is subject to a terminal disclaimer.

(21) Appl. No.: 13/794,227

(22) Filed: Mar. 11, 2013

Related U.S. Application Data

(60) Provisional application No. 61/732,523, filed on Dec. 3, 2012.

(51) Int. Cl.
A63B 69/36 (2006.01)
A63B 57/00 (2006.01)

(52) U.S. Cl.
CPC ................... A63B 57/00 (2013.01)
USPC .......... 473/407; 473/131; 473/221; 473/222; 473/233; 473/409

(58) Field of Classification Search
CPC ................ A63B 2220/12; A63B 2243/0029; A63B 2225/50
USPC ................. 473/131, 221, 222, 233, 407, 409
See application file for complete search history.

(56) References Cited

U.S. PATENT DOCUMENTS

| | | |
|---|---|---|
| 4,991,850 A | 2/1991 | Wilhlem |
| 5,209,483 A | 5/1993 | Gedney et al. |
| 5,319,548 A | 6/1994 | Germain |
| 5,619,076 A | 4/1997 | Layden et al. |
| 5,772,534 A | 6/1998 | Dudley |
| 6,224,493 B1 | 5/2001 | Lee et al. |
| 6,402,634 B2 | 6/2002 | Lee et al. |
| 6,431,990 B1 | 8/2002 | Manwaring |
| 6,638,175 B2 | 10/2003 | Lee et al. |
| 6,648,769 B2 | 11/2003 | Lee et al. |
| 6,821,209 B2 | 11/2004 | Manwaring et al. |
| 6,923,729 B2 | 8/2005 | McGinty et al. |
| 7,163,468 B2 | 1/2007 | Gibbs et al. |
| 7,163,470 B2 | 1/2007 | Galloway et al. |
| 7,166,038 B2 | 1/2007 | Williams |
| 7,214,143 B2 | 5/2007 | Deshmukh |
| 7,252,600 B2 | 8/2007 | Murphy |
| 7,258,626 B2 | 8/2007 | Gibbs et al. |
| 7,258,631 B2 | 8/2007 | Galloway et al. |
| 7,273,419 B2 | 9/2007 | Evans et al. |
| 7,413,520 B1 | 8/2008 | Hocknell et al. |
| 7,800,480 B1 | 9/2010 | Joseph et al. |
| 7,801,575 B1 | 9/2010 | Balardeta et al. |
| 7,804,404 B1 | 9/2010 | Balardeta et al. |

(Continued)

Primary Examiner — Jay Liddle
Assistant Examiner — Ryan Hsu
(74) Attorney, Agent, or Firm — Michael A. Catania; Sonia Lari; Rebecca Hanovice

(57) ABSTRACT

A method for analyzing a golfer's swing speed, wherein the method comprises determining that the golfer is addressing a golf ball to swing a golf club, monitoring a backswing, determining a transition time, monitoring a downswing, determining an impact time, transmitting data for the golfer's swing to a receiver for analysis and generating a golfer's swing speed using a length of a shaft of the golf club. A device is positioned or built within a grip of the golf club.

13 Claims, 8 Drawing Sheets

(56) References Cited

U.S. PATENT DOCUMENTS

| | | | |
|---|---|---|---|
| 7,831,212 B1 | 11/2010 | Balardeta et al. | |
| 7,883,428 B1 * | 2/2011 | Balardeta et al. | 473/222 |
| 7,927,225 B1 * | 4/2011 | Balardeta et al. | 473/222 |
| 8,272,970 B2 * | 9/2012 | Balardeta et al. | 473/222 |
| 8,668,595 B2 * | 3/2014 | Boyd et al. | 473/223 |
| 2001/0041535 A1 * | 11/2001 | Karmel | 455/12.1 |
| 2002/0082122 A1 | 6/2002 | Pippin et al. | |
| 2002/0123386 A1 | 9/2002 | Perlmutter | |
| 2003/0017882 A1 | 1/2003 | Hossack | |
| 2003/0163287 A1 | 8/2003 | Vock et al. | |
| 2003/0207718 A1 | 11/2003 | Perlmutter | |
| 2005/0020369 A1 | 1/2005 | Davis et al. | |
| 2005/0227791 A1 | 10/2005 | McCreary et al. | |
| 2006/0017692 A1 | 1/2006 | Wehrenberg et al. | |
| 2006/0166737 A1 | 7/2006 | Bentley | |
| 2006/0166738 A1 | 7/2006 | Eyestone et al. | |
| 2008/0001720 A1 | 1/2008 | Tuttle | |
| 2008/0147211 A1 | 6/2008 | Teller | |
| 2008/0252445 A1 | 10/2008 | Kolen | |
| 2009/0017944 A1 * | 1/2009 | Savarese et al. | 473/407 |
| 2009/0029754 A1 | 1/2009 | Slocum et al. | |
| 2009/0075761 A1 | 3/2009 | Balardeta et al. | |
| 2009/0111602 A1 | 4/2009 | Savarese et al. | |
| 2009/0209358 A1 | 8/2009 | Niegowski | |
| 2009/0233735 A1 | 9/2009 | Sevarese et al. | |
| 2009/0305819 A1 | 12/2009 | Denton et al. | |
| 2009/0305820 A1 | 12/2009 | Denton et al. | |
| 2010/0045443 A1 | 2/2010 | Steeves | |
| 2010/0060428 A1 | 3/2010 | Lee et al. | |
| 2010/0076692 A1 | 3/2010 | Vock et al. | |
| 2010/0097208 A1 | 4/2010 | Rosing et al. | |
| 2010/0144456 A1 | 6/2010 | Ahern | |
| 2010/0308105 A1 * | 12/2010 | Savarese et al. | 235/375 |
| 2012/0015754 A1 * | 1/2012 | Balardeta et al. | 473/222 |

* cited by examiner

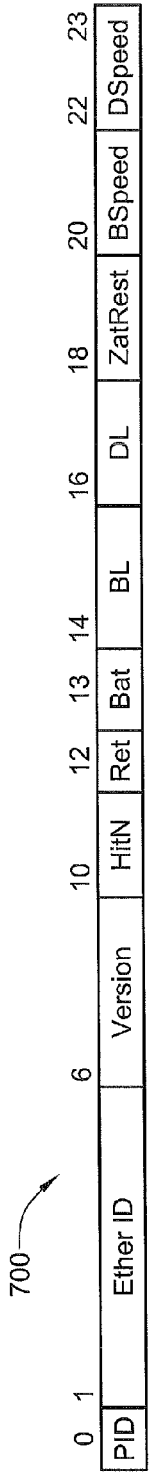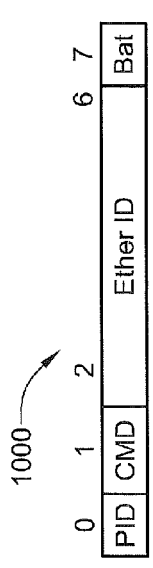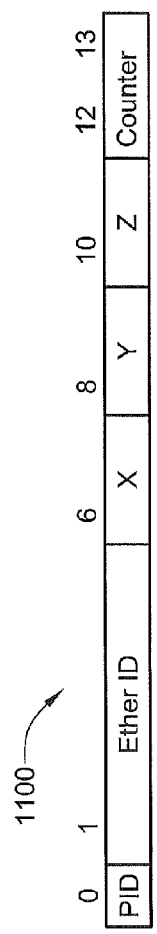
FIG. 7  FIG. 8  FIG. 9  FIG. 10  FIG. 11

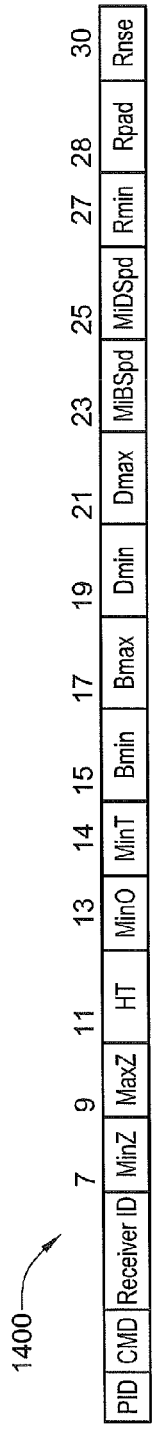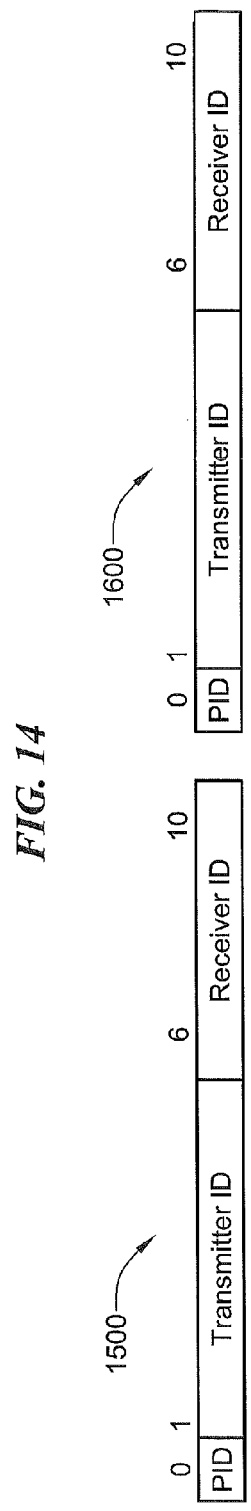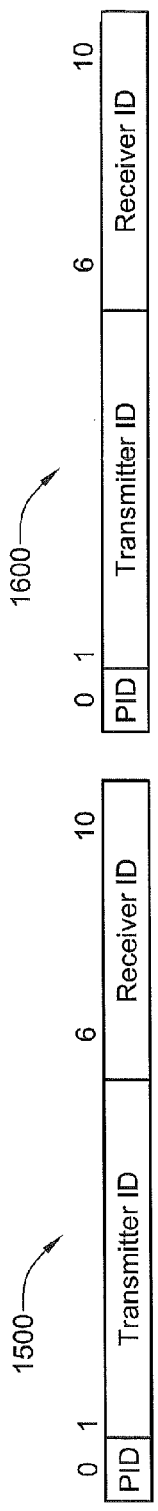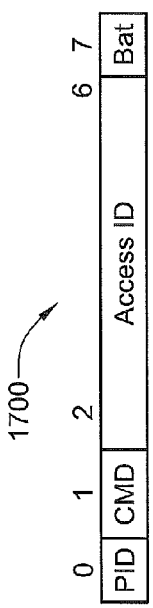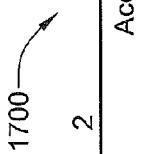
FIG. 12
FIG. 13
FIG. 14
FIG. 15
FIG. 16
FIG. 17

METHOD AND SYSTEM FOR SWING ANALYSIS

CROSS REFERENCE TO RELATED APPLICATION

The present application claims priority to U.S. Provisional Patent Application No. 61/732,523, filed on Dec. 3, 2012, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention relates to swing analysis. More specifically, the present invention relates to a method and system for swing analysis of a golfer during a round of golf.

2. Description of the Related Art

Golf clubs combine with the players swing to propel a ball toward a favored location and through a favored path. The orientation and speed of the club head at impact largely determines the ball path including carry distance and roll.

The prior art is lacking in a method and system to measure the motion of the club through measurement of the shaft.

BRIEF SUMMARY OF THE INVENTION

The present invention is novel in that the observation of the relative motion does not depend on near visible light and uses a coherent pattern to capture the position of the club relative the ground antenna transmitter/receiver. This fixed device also includes a display, computing capability and recording device. This information, when processed, enables the display of the swing and uses data on the club head and ball to calculate the flight of the ball.

This invention is a method for predicting a golfer's swing speed. The method comprises determining that a golfer is addressing a golf ball to swing a golf club, wherein the golf club comprises a device comprising an accelerometer and a radiofrequency transceiver. The method further comprises monitoring a backswing of the golfer, determining an impact time of the golf club with the golf ball and transmitting data for the golfer's swing to a receiver for analysis. The data comprises the transition time and the impact time. Further, the method comprises generating a golfer's swing speed using a length of a shaft of the golf club, the transition time and the impact time.

One aspect of the present invention is a system for tracking a golfer's round of golf. The system comprises a plurality of golf clubs, each of the plurality of golf clubs comprising a grip with an internal device, and the grip is attached to a shaft which is attached to a golf club head. The device comprises a power source, a means for determining impact, a microprocessor and a RFID component, wherein impact of a golf club of the plurality of golf clubs swung by the golfer activates the impact means to have the microprocessor transmit a signal from the RFID component for transmission. The signal comprises a type of golf club impacted, and the power source comprises a battery, a resistor and a capacitor, and an RFID component comprising a RFID transponder and a processor. The system further comprises a GPS device for receiving the signal from the RFID component. The system further comprises a GPS device which stores data for each golf shot swung by the golfer for a round of golf, wherein the GPS device is configured to record the current location of the GPS device, an identification of a golf club used by the golfer for each golf shot and the time that the golf club was used to determine a distance for each golf shot based on a current location and a prior location of a prior golf shot.

Yet another aspect of the present invention is a method for tracking a golfer's round of golf wherein the method comprises determining a current location of a GPS device for a golfer on the golf course, receiving a signal from a first golf club of the golfer that the first golf club struck a golf ball at the current location, recording the current location on the GPS device and identifying the first golf club and a time that the first golf club struck the golf ball at the current location. The method further comprising determining a distance from the current location to a prior location and recording the distance as a distance for a prior golf shot of the golfer. This method may further comprise the signal being sent from a device, wherein the device comprises a housing and a battery, wherein the battery is positioned within the housing and the battery has no more than 225 milliamp hours of power. The device further comprises a microprocessor positioned within the housing, the microprocessor in electrical communication with the battery, the microprocessor operating during a sleep mode, a sampling mode, an analysis mode, a monitoring mode and a transmission mode. The device further comprises a multi-axis accelerometer for determining movement, monitoring movement and communicating the movement to the microprocessor. The multi-axis accelerometer is positioned within the housing and the multi-axis accelerometer is in electrical communication with the microprocessor. The power for the multi-axis accelerometer is drawn from the battery and the multi-axis accelerometer is only active during the sampling mode, the analysis mode and the monitoring mode. The device further comprises a radiofrequency component positioned within the housing, the radiofrequency component in electrical communication with the microprocessor. The radiofrequency component operates at 2.4 gigaHertz and the power for the radiofrequency component is drawn from the battery. The radiofrequency component is only operable during a transmission mode, transmitting a signal from the radiofrequency component during the transmission mode. The signal comprises data related to the movement monitored by the multi-axis accelerometer. The device consumes less than 600 nano-amps during the sleep mode, wherein the sleep mode has a time period ranging from 10 seconds to 30 seconds. The device consumes less than 15 micro-amps during the sampling mode, less than 50 micro-amps during the analysis mode, less than 200 micro-amps during the monitoring mode and less than 12 milli-amps during the transmission mode.

Lastly, this invention comprises a system for tracking a golfer's round of golf, the system comprising a plurality of golf clubs, each of the plurality of golf clubs comprising a shaft and a golf club head. The shaft has a shock switch in electrical communication with an active RFID transponder. The shock switch temporarily closes during impact with a golf ball to provide power from a power source to the RFID transponder for transmission of a signal. The signal comprises the type of club and force of the shot. The system further comprises a GPS device for receiving the signal from the RFID transponder, wherein the GPS device stores data for each shot by the golfer for a round of golf. The GPS device is configured to record the current location of the GPS device, an identification of a golf club used by the golfer for each golf shot and the time that the golf club was used to determine a distance for each golf shot based on a current location and a prior location of a prior golf shot.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 7 is a signal packet for an output packet from a club to a receiver for a golf club impact with a golf ball.

FIG. 8 is a signal packet for an output packet from a club to a receiver for an acceleration for a downswing.

FIG. 9 is signal packet for an output packet from a club to a receiver for a command mode.

FIG. 10 is signal packet for an output packet from a club to a receiver for a command response.

FIG. 11 is signal packet for an output packet from a club to a receiver for a trainer mode.

FIG. 12 is signal packet for an output packet from a club to a receiver for a debug mode.

FIG. 13 is a signal packet for an input packet from a receiver to a golf club for a command.

FIG. 14 is a signal packet for an input packet from a receiver to a golf club for a command.

FIG. 15 is a signal packet for an inter-unit packet from a receiver to a receiver for a message packet.

FIG. 16 is a signal packet for an inter-unit packet from a receiver to a receiver for a message acknowledgement packet.

FIG. 17 is a signal packet for an inter-unit packet from a receiver to a receiver for a command.

DETAILED DESCRIPTION OF THE INVENTION

Figure 1:
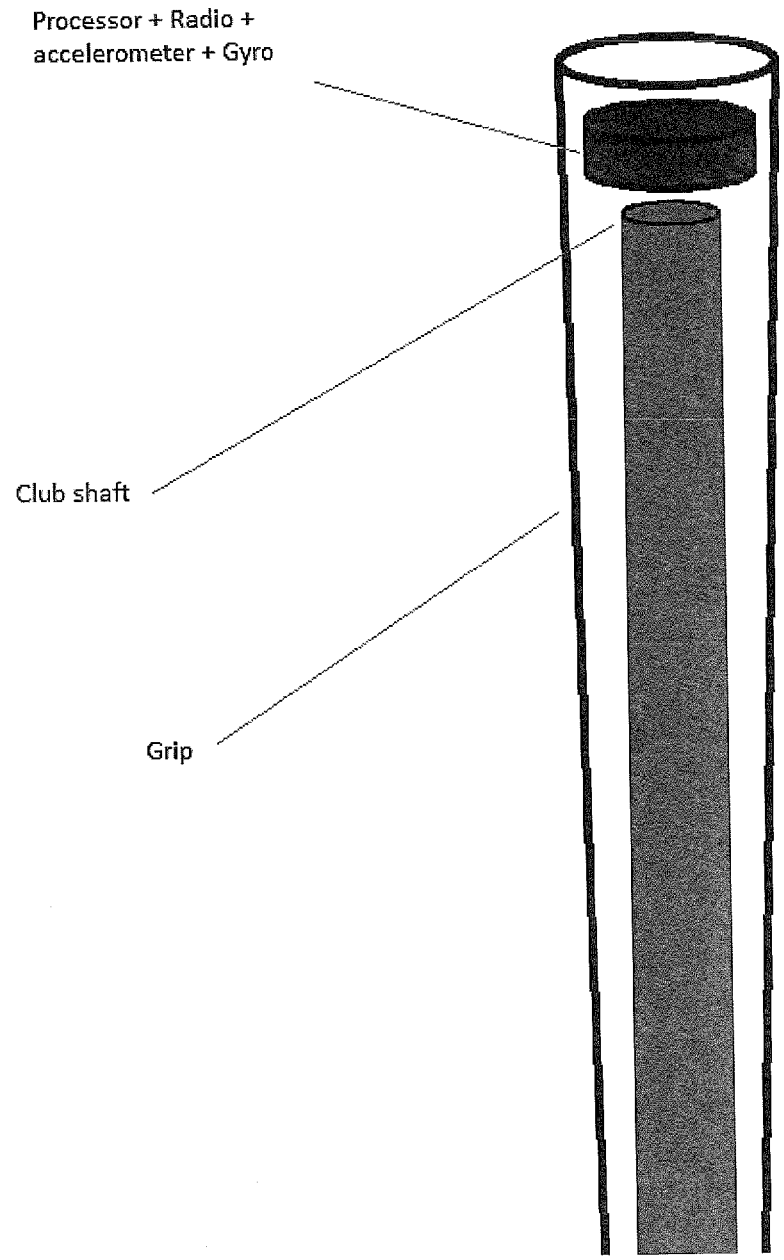
FIG. 1 is a cut-away view of a grip with a device for shot tracking positioned above a shaft of a golf club.
Figure 2:
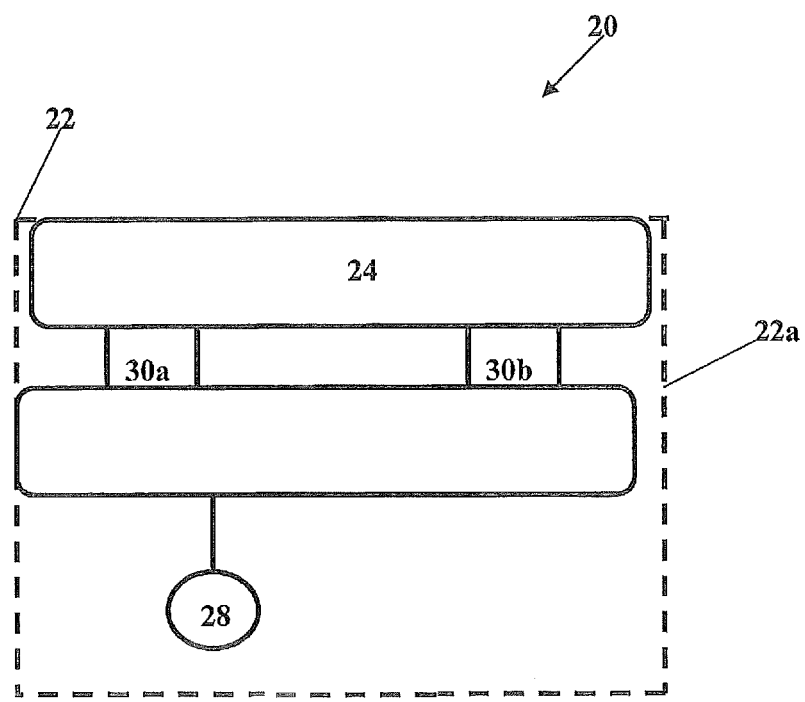
FIG. 2 is a perspective view of components of a device for shot tracking.
Figure 3:
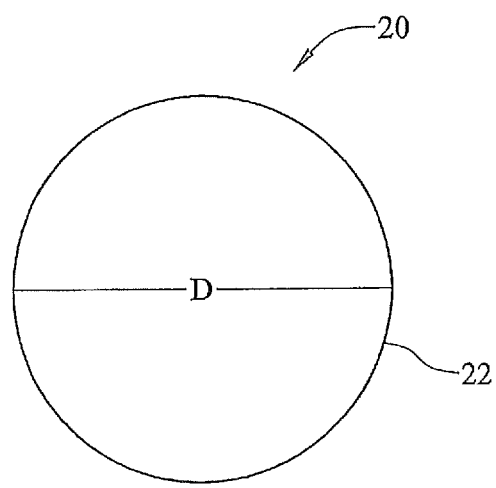
FIG. 3 shows the housing component of the shot tracking device and illustrates the diameter.
Figure 4:
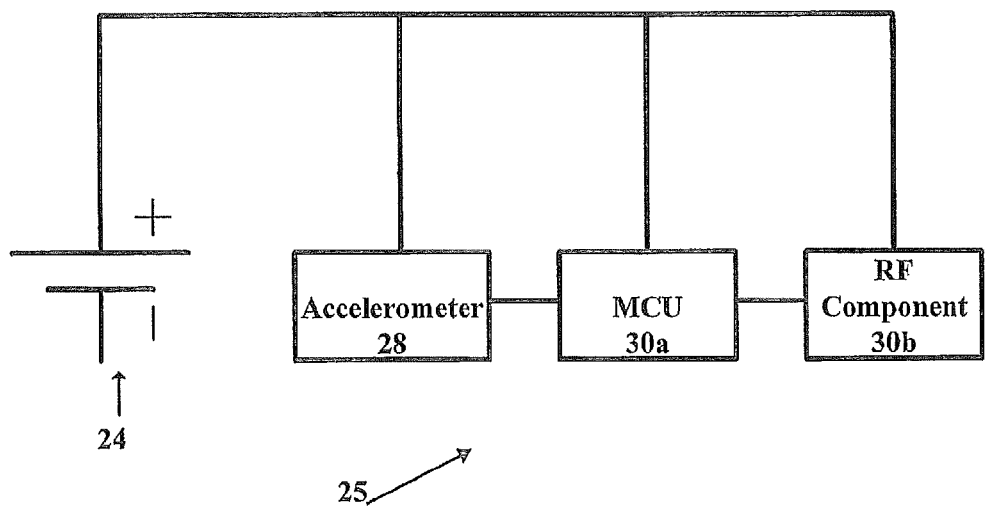
FIG. 4 is an illustration of the circuit diagram of the components of a device for shot tracking.

FIGS. 1-4 illustrate the internal components within a grip of a golf club head. A device 20 comprising at least a processor 30, accelerometer 28, radio 30b, a power supply 24 and a gyro is placed within a grip of a golf club head above a butt end of a shaft, as illustrated in FIGS. 1-4.

Figure 5:
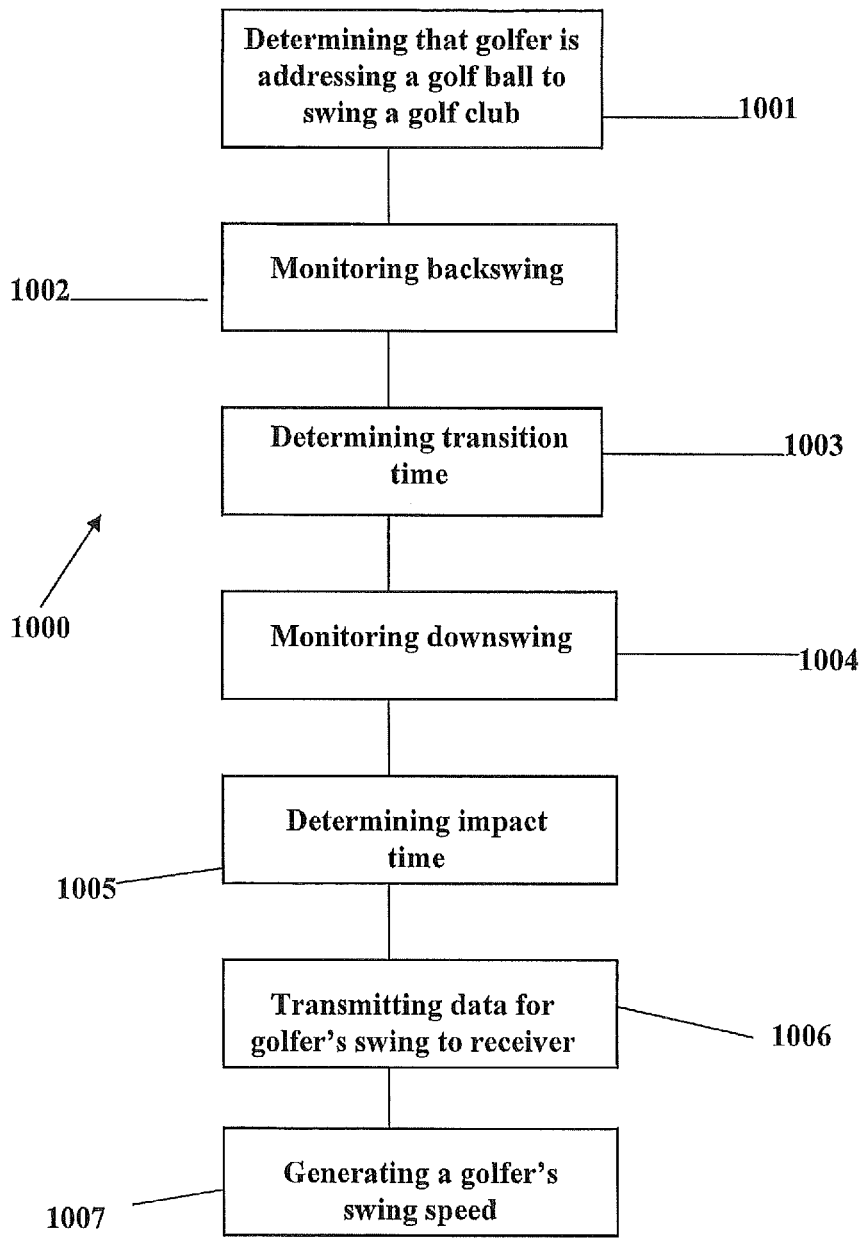
FIG. 5 is a flow chart of a method of shot tracking.

FIG. 5 is a flow chart of a method 1000 for shot tracking. At block 1001, a location of the GPS device is determined. At block 1002, signal is received signal from a first golf club of the golfer that the first golf club struck a golf ball. At block 1003, an identification of the first golf club and a time that the first golf club struck the golf ball at the first location is determined. At block 1004, a second location of the GPS device is determined. At block 1005, a signal from a second golf club of the golfer that the second golf club struck the golf ball at the second location is received. At block 1006, a distance from the first location to the second location is determined and recorded as the distance for a first shot of the golfer.

A transponder in a golf club 50 swung by a golfer sends a signal 62 to a receiver 60. The receiver is attached to a golf bag 61, however, those skilled within the pertinent art will recognize that the receiver may be attached to any pertinent device including the golfer, or may stand alone.

This invention is a method 1000 for predicting a golfer's swing speed. The method 1000 comprises determining that a golfer is addressing a golf ball to swing a golf club 50, wherein the golf club 50 comprises a device comprising an accelerometer 28 and a radiofrequency transceiver 1001. The method further comprises monitoring a backswing of the golfer 1002, determining an impact time of the golf club 50 with the golf ball 10055 and transmitting data for the golfer's 40 swing to a receiver for analysis 1006. The data comprises the transition time and the impact time. Further, the method comprises generating a golfer's swing speed using a length of a shaft of the golf club, the transition time and the impact time 1007.

Preferably, the method 1000 comprises transmitting the data on the golfer's swing in a single transmission. Alternatively, the data comprising the golfer's 40 swing is transmitted in a plurality of transmission. The data for the golfer's 40 swing is preferably transmitted at a radiofrequency of 2.4 gigaHertz utilizing the radiofrequency transceiver of the device 10. The device 10 may further comprise a microprocessor 30a and a battery 24. Preferably, the accelerometer 28 of the device is a multi-axis accelerometer. The monitoring of the backswing and downswing is preferably at a rate of 1 kilo-Hertz or alternatively at a rate of 5 kilo-Hertz. A preferred receiver is a GPS device 60, a Smart Phone, PDA, or computer.

The method 1000 further comprises transmitting data comprising data on the golfer's 40 swing in a single transmission. The method may also comprise transmitting data in a plurality of transmissions. The data for a golfer's 40 swing is preferably transmitted at a radiofrequency of 2.5 gigaHertz utilizing the radiofrequency transceiver 30b of the device 10. The method 1000 may comprise wherein the monitoring of the backswing and the monitoring of the downswing occur at a rate of at least 1 kilo-Hertz or alternatively at a rate of 5 kilo-Hertz. The receiver 60 is preferably a GPS device or alternatively may be a Smart Phone, PDA, or computer. The device 10 preferably comprises a battery 24 and a microprocessor 30a and the accelerometer 28 is preferably a multiple axis accelerometer.

Figure 6:
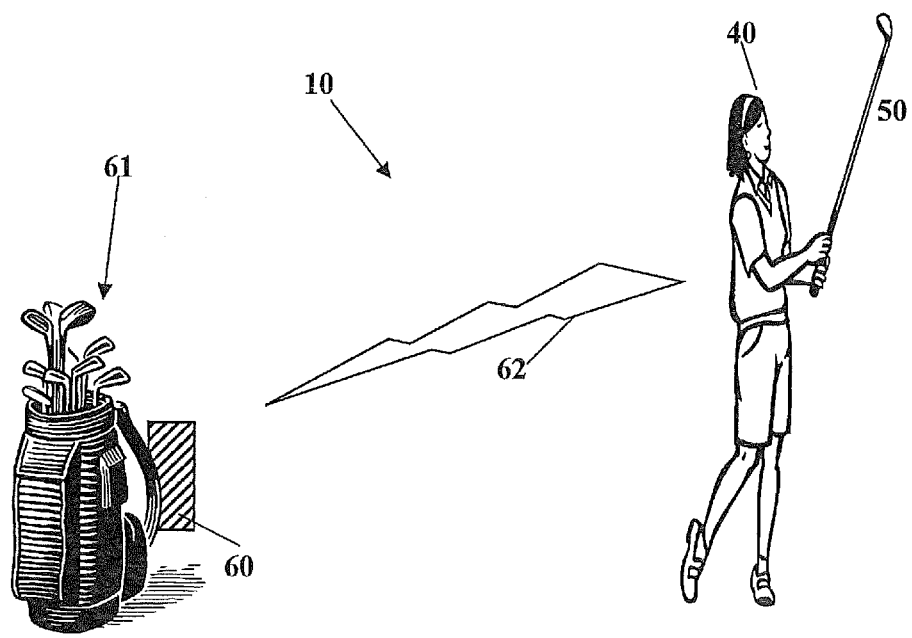
FIG. 6 illustrates the system 20.

The invention further comprises a system 10 for predicting a golfer's 40 swing speed as shown in FIG. 6. The system 10 comprises a golf club 50 comprising a head, a shaft, a grip and a device 10 attached to the grip. The device 10 comprises a microprocessor 30a, an accelerometer 28 and a radiofrequency transceiver 30b. The microprocessor 30a is configured to determine that a golfer 40 is addressing a golf bail to swing a golf club 50, monitor a backswing of the golfer 40, determine a transition time from a backswing to a downswing of the golfer 40, monitor the downswing of the golfer 40, determine an impact time of the golf club 50 with the golf ball and transmit date for the golfer's 40 swing. The data comprises the transition time and the impact time. The system 10 further comprises a receiver comprising a microprocessor and a transceiver wherein the transceiver operates on the first communication protocol and the microprocessor 30b is configured to generate a golfer's 40 swing speed using a length of a shaft of the golf club 50, the transition time and the impact time.

Preferably, the microprocessor 30b is configured to transmit fate on the golfer's 40 swing in a single transmission. Alternatively, the microprocessor 30b is configured to transmit the data in a plurality of transmission. The microprocessor 30b is preferably configured to monitor the backswing and monitor the downswing at a rate of at least 1 kilo-Hertz or alternatively at a rate of at least 5 kilo-Hertz. The data for the golfer's 40 swing is transmitted at a radiofrequency of 2.4 gigaHertz utilizing the radiofrequency transceiver 30b of the device 10. The device 10 may further comprise a microprocessor 30a, battery 24 and a multiple axis accelerometer 28. The receiver 60 of the system 10 is preferably a GPS device or alternatively a Smart Phone, PDA, or computer.

In an embodiment, the data of the golfer's swing is transmitted from a device 20 comprising a housing 22 composed of a polymer material. The device is built into a grip. As shown, a battery 24 is positioned within the housing 22 and a microprocessor 30a is positioned within the housing 22, wherein the microprocessor 30a is in electrical communication with the battery 24. The device 20 further comprises a multi-axis accelerometer 28 for determining movement, monitoring movement and communicating the movement to the microprocessor, wherein the multi-axis accelerometer 28 positioned within the housing 22. The multi-axis accelerometer 28 is in electrical communication with the microprocessor 30a. A radiofrequency component 30b is positioned within the housing 22, wherein the radiofrequency component 30b in electrical communication with the microprocessor 30a. The radiofrequency component 30b operates at 2.4 giga-Hertz, and the radiofrequency component 30b transmits a signal 62 comprising data related to the movement monitored by the multi-axis accelerometer 28.

The battery 24 is preferably a CR1620 having at least 75 milliamps of power. The receiver is preferably a GPS device 60 such as disclosed in Balardeta et al., U.S. Patent Publication Number 20090075761 for a Golf GPS Device And System, which is hereby incorporated by reference in its entirety. Alternatively, the receiver is a personal digital assistant (PDA), "smart phone", mobile phone, or other similar device. However, those skilled in the pertinent art will recognize that the receiver may be any device capable of receiving and storing signals from the RFID tag.

Gibbs, et al., U.S. Pat. No. 7,163,468 is hereby incorporated by reference in its entirety.

Galloway, et al., U.S. Pat. No. 7,163,470 is hereby incorporated by reference in its entirety.

Williams, et al., U.S. Pat. No. 7,166,038 is hereby incorporated by reference in its entirety.

Desmukh U.S. Pat. No. 7,214,143 is hereby incorporated by reference in its entirety.

Murphy, et al., U.S. Pat. No. 7,252,600 is hereby incorporated by reference in its entirety.

Gibbs, et al., U.S. Pat. No. 7,258,626 is hereby incorporated by reference in its entirety.

Galloway, et al., U.S. Pat. No. 7,258,631 is hereby incorporated by reference in its entirety.

Evans, et al., U.S. Pat. No. 7,273,419 is hereby incorporated by reference in its entirety.

Hocknell, et al., U.S. Pat. No. 7,413,250 is hereby incorporated by reference in its entirety.

The measurements may be inputted into an impact code such as the rigid body code disclosed in U.S. Pat. No. 6,821,209, entitled Method for Predicting a Golfer's Ball Striking Performance, which is hereby incorporated by reference in its entirety.

The swing properties are preferably determined using an acquisition system such as disclosed in U.S. Pat. No. 6,431,990, entitled System and Method for Measuring a Golfer's Ball Striking Parameters, assigned to Callaway Golf Company, the assignee of the present application, and hereby incorporated by reference in its entirety. However, those skilled in the pertinent art will recognize that other acquisition systems may be used to determine the swing properties.

Other methods that are useful in obtaining a golfer's swing characteristics are disclosed in U.S. Pat. No. 6,638,175, for a Diagnostic Golf Club System, U.S. Pat. No. 6,402,634, for an Instrumented Golf Club System And Method Of Use, and U.S. Pat. No. 6,224,493, for an Instrumented Golf Club System And Method Of Use, all of which are assigned to Callaway Golf Company, the assignee of the present application, and all of which are hereby incorporated by reference in their entireties.

Check of battery voltage every 15 shots using ADC. In every 15 shots, before each shot is transmitted, the ADC on the Microcontroller unit is enabled to measure the voltage on the battery and that data is transmitted in the HIT packet ([5]).

Two deep sleep modes: S4, S5. To save power, all 3 devices sleep during 5 seconds at total current of 2.2 uA (S4). That can mean a total of 3 years of battery life depending on how many swings performed by that club. Every 5 seconds the MCU and accelerometer wakes up (S3) to determine activity and orientation ([3]). Based on activity and orientation the device goes into the swing check state. Additionally, if after 3 minutes of inactivity the device remained in the same exact position, it goes into a deeper sleep state (S5) with checks every 30 seconds.

Wakeup based on movement and orientation. Every 5 seconds the MCU and accelerometer wakes up (2) and acquires 3 samples at 400 Hz. Comparing these 3 samples, it is possible to define: If the club moved; If the club Z orientation is such that would characterize a position suitable for a start of a swing.

Rotation to initiate command mode (+Active check). In order to put the device into a mode where it is able to receive special commands ([5]), the club needs to be rotated on its Z axis twice. That movement triggers a sequence of values that identify the rotation around the Z axis. Once the rotation is identified, the device goes into the command mode. That move can be performed from the factory, S3 or from swing checking states.

Trainer Mode (whole block). The ability of transmitting the "raw" data from the accelerometer thru radio packets to be analyzed and displayed in the GPS unit. This can be done "real time" or the data stored in the microcontroller's memory can be transmitted to the GPS unit.

Sleep while collecting data from accelerometer. The Radio stays OFF and the microcontroller goes into a very low power state while acquiring data from the accelerometer in the swing check state.

Factory test+ID burn. To save manufacturing time, the factory tests and the ID number recording are done in the same process: The serial number is stamped on the sensor; The device goes into command mode [4]; The number is scanned with a hand scanner; A PC-based tool sends the Factory test command to the device; The factory tests continuously read accelerometer data and send it thru the radio.

Speed estimation based on integration of XYZ accelerations. A relative speed can be defined by integrating the accelerations from start of downswing to impact. That information is also sent in the HIT packet [5].

Detection and transmission of backswing and downswing lengths. Once the start of the swing [13] is defined, the inversion of the acceleration defines the end of backswing and start of downswing. So: Backswing length=<Point of start of downswing>−<Point of start of backswing>. Downswing length=<Point of impact>−<Point of start of downswing>. That data is transmitted on the HIT packet [5].

Check for hit based on acceleration offsets at 5 kHz. The impact is defined not by the total acceleration but by the acceleration delta between 2 acceleration samples.

Accelerometer data rate at 250 Hz. Acquire 250 samples per second to be able to detect fast acceleration changes (specifically on chipping).

Check for beginning of swing based on: Z variation; Continuous XYZ acceleration change in the same direction; Comparison to Z at rest.

Analysis of swing data based on a ring buffer containing 3 seconds of XYZ samples collected before impact. A ring buffer is continuously being filled with accelerometer data in the swing check state up to the detection of the impact. The data is then averaged and analyzed backwards until it gets to the start of the swing.

Dynamic switch to higher sample rate in the middle of swing to be able to detect hit. Fast impacts can only be detected at 5 kHz but this setting consumes too much battery in order to save battery, the accelerometer runs at 250 Hz [12] but it switches to 5 kHz when it defines a downswing.

Wake-up based on capacitive touch on a conductive grip. To achieve lower power consumption, instead of waking up every 5 seconds, the device can be awakened by the touch of a hand on a grip that exposes strips of conductive rubber.

Minimum rest length defines the start of the analysis of a possible swing. Different downloadable profiles. Updatable Flash thru website. Pairing off up to 5 different receivers. Periodic checks of the ADC to measure battery voltage. Transitory S3 state.

Sending of the downswing snapshot. In addition to the HIT packet, an acceleration packet is also sent to the GPS unit [5]. That information can be used to display a graph in the GPS unit that shows visual cues about the swing.

For Pairing:

T Handheld unit goes into Pairing mode (listens and waits for a command mode packet from Ether). The club will be going to full sleep every 8 seconds and waking up to check for upright orientation. If the club is upright, club wakes up and waits for the pairing routine to be executed by the user within 10 seconds. Once the pairing routine is executed, Ether sends a command mode packet indicating it is ready to receive commands from the handheld device. On the receiver side, when the command mode packet is received, it changes its address to the default factory address, switches to transmit mode and sends the command packet with the receiver address to the club. On the club, when the Pairing command packet is received, it changes the radio address to the receiver address received and sends a command response packet to the club to confirm the pairing is finished. If the club fails to communicate to the receiver (auto-retry times out), it resets its address to the default factory address, remains in factory mode. If the club succeeds, it moves into running mode. Pairing and any other commands have to be sent on channel 1 and with the default address: 2233445502.

The 5 bytes of the serial number on the receiver is going to be the radio address. Both Ether and receiver are going to be at auto acknowledgement mode.

In the rare case were 2 or more clubs send data at exactly the same time (a window of 250 us), an ACK will be sent and it will be received by both. In that case, both hits will receive the same ACK, only the first one will be received processed and an extra ACK will be sent.

When a guest pairs, it will receive the Host receiver ID, and that will be used as RX address of PIPE1 of the guest devices. Guest's Auto ACK is turned off for PIPE1. Packets sent by guest devices to the host must have the NO_ACK flag set (Packets received with the NO_ACK flag set do not generate auto ACK).

Receivers and Club IDs are represented as an alphanumerical value+a 9 digit decimal number. Ex: D123456789, and are stored as an CHAR plus an unsigned long (32 bits Little-Endian).

TABLE ONE

Output packets from a golf club to a receiver. As shown in FIG. 7.

| | |
|---|---|
| Description: | Packet sent when a swing + hit occurs |
| PID | "H" = Hit packet ID |
| Ether ID | Ether ID stored in ROM on the club |
| Version | 4 bytes specifying the current firmware version on the Ether device (Major.Mid.Minor + engineering tag) If the engineering tag is 0, it is an official release. Otherwise, the tag is the number of the engineering release. |
| HitN | Hit number (ushort) |
| Ret | Number of retries (byte) |
| Bat | 1 byte with the raw value for battery level read from the ADC (Check table for actual voltage) |
| BL | Backswing length (ushort) |
| DL | Downswing length (ushort) |
| ZatRest | Z value at rest (short) |
| BSpeed | Backswing relative speed (ushort) |
| DSpeed | Downswing relative speed (ushort) |

TABLE TWO

The acceleration of the golf club. The signal packet is shown in FIG. 8.

| | |
|---|---|
| Description: | Snapshot of accelerations thru downswing (sent when a swing + hit occurs) |
| PID | "A" = Acceleration packet ID |
| Ether ID | Ether ID stored in ROM on the club |
| Acc[0 . . . 12] | 13 unsigned short values with acceleration slice values |

TABLE THREE

The command mode. The signal packet is shown in FIG. 9.

| | |
|---|---|
| Description: | Indicates to the receiver that the device is in "command mode" or ready to receive commands Obs: This same command will be used to pair a guest handheld device. |
| PID | "R" = Command mode packet ID |
| Ether ID | Ether ID (Stored in ROM on the club) |

TABLE FOUR

The command response. The signal packet is shown in FIG. 10.

| | |
|---|---|
| Description: | Response to a command packet |
| PID | "C" = Command response packet ID |
| CMD | Command executed |
| Ether ID | Ether ID stored in ROM on the club |

TABLE FOUR-continued

The command response. The signal packet is shown in FIG. 10.

| | |
|---|---|
| Bat | One byte indicating current battery voltage * |

*Returned for the Battery check command only.

TABLE FIVE

The trainer mode. The signal packet is shown in FIG. 11.

| | |
|---|---|
| Description: | Trainer mode data. Data from the accelerometer on the club is streamed to the receiver. |
| PID | "T" = Trainer packet ID |
| Ether ID | Ether ID stored in ROM on the club |
| X, Y, Z | 16-bit data for X, Y and Z |
| Counter | Data counter (to count missing packets) |

TABLE SIX

The debug mode. The signal packet is shown in FIG. 11.

| | |
|---|---|
| Description | Debug messages coming from the club |
| PID | "D" = Debug packet ID |
| Ether ID | Ether ID stored in ROM on the club |

TABLE SEVEN

The input packets from the receiver to the club. The signal packet is shown in FIG. 13.

| | |
|---|---|
| Description: | Commands to be sent to the club when it is in command mode. |
| PID | "C" = Command packet ID |
| CMD | Command to be executed: |

TABLE EIGHT

The inter unit packets from the receiver to receiver. The signal packet is shown in FIG. 15.

| | | | |
|---|---|---|---|
| 'A' | Battery check | | |
| 'P' | Pairing | | |
| | For pairing, we send the following club profile parameters: | | |
| | Param | Size | Description |
| | MinZ | 2 | Maximum inclination of the club |
| | MaxZ | 2 | Minimum inclination of the club |
| | HT | 2 | Hit Threshold. G offset between samples that define a hit. |
| | MinO | 1 | Minimum G offset to be taken in account to start analisis |
| | MinT | 1 | Minimum time of up or down movement to define a direction change |
| | Bmin | 2 | Minimum time to define a backswing |
| | Bmax | 2 | Maximum backswing length allowed |
| | Dmin | 2 | Minimum time to define a downswing |
| | Dmax | 2 | Maximum downswing length allowed |

TABLE EIGHT-continued

The inter unit packets from the receiver to receiver. The signal packet is shown in FIG. 15.

| | | | |
|---|---|---|---|
| | MiBSpd | 2 | Minimum speed at Backswing |
| | MiDSpd | 2 | Minimum speed at Downswing |
| | Rmin | 1 | Minimum time to count as a rest |
| | Rpad | 2 | Rest padding - Max time between a rest and the beginning of a swing |
| | Rnse | 1 | Maximum noise allowed on a rest |
| 'R' | Start/Stop Trainer Mode (Toggle. RX device needs to send the stop packet as ACK payload) | | |
| 'T' | Start/Stop Factory tests (Toggle. RX device needs to send the stop packet as ACK payload) The Factory tests command also burns the Ether ID when run for the first time | | |

TABLE NINE

The inter unit packets from the receiver to receiver. The signal packet is shown in FIG. 15.

| | |
|---|---|
| Description: | Message packet. Contains messages between 2 handheld devices. |
| PID | "M" = MSG packet ID |
| Receiver ID | The serial number of the receiver device |
| Access ID | Transmitter's access ID |
| Obs: | This packet should be sent as an ACK payload |

TABLE TEN

The inter unit packets from the receiver to receiver. The signal packet is shown in FIG. 16.

| | |
|---|---|
| Description: | Acknowledgment packet. It will only be sent as a response to MSG packets. |
| PID | "K" = MSG ACK packet ID |
| Receiver ID | The serial number of the Host receiver (same as the one received in the MSG packet) |
| Transmitter ID | Guest's access ID (same as the one received in the MSG packet) |

TABLE ELEVEN

The inter unit packets from the receiver to receiver. The signal packet is shown in FIG. 17.

| | |
|---|---|
| Description: | Response to a command packet |
| PID | "C" = Command response packet ID |
| CMD | Command executed |
| Access ID | Device ID (Currently stored in ROM on the club). |
| Bat | One byte indicating current battery voltage |

The invention claimed is:

1. A method for tracking a golfer's round of golf, the method comprising:
determining a first location of a GPS device for a golfer on a golf course; receiving at the GPS device a first signal packet from a first golf club of the golfer that the first golf club struck a golf ball at the first location, the first signal packet comprising a backswing length, a downswing length, a backswing relative speed and a downswing relative speed;

storing on the GPS device the first location on the golf course, an identification of the first golf club, a time that the first golf club struck the golf ball at the first location, the backswing length, the downswing length, the backswing relative speed and the downswing relative speed;

determining a second location of the GPS device for the golfer on the golf course; receiving at the GPS device a second signal packet from a second golf club of the golfer that the second golf club struck the golf ball at the second location the first signal packet comprising a backswing length, a downswing length, a backswing relative speed and a downswing relative speed;

determining a distance from the first location to the second location; and storing the distance as a distance for a first shot of the golfer, and storing the backswing length, the downswing length, the backswing relative speed and the downswing relative speed for each shot by the golfer;

wherein the signal packet is sent from a device positioned within a grip of a golf club, the device comprising:

a housing;

a battery having no more than 225 milliamp hours of power, the battery positioned within the housing;

a microprocessor positioned within the housing, the microprocessor in electrical communication with the battery, the microprocessor operating during a sleep mode, a sampling mode, an analysis mode, a monitoring mode and a transmission mode;

a multi-axis accelerometer for determining movement, monitoring movement and communicating the movement to the microprocessor, the multi-axis accelerometer positioned within the housing, the multi-axis accelerometer in electrical communication with the microprocessor, the power for the multi-axis accelerometer drawn from the battery, the multi-axis accelerometer only active during the sampling mode, the analysis mode and the monitoring mode;

a radiofrequency component positioned within the housing, the radiofrequency component in electrical communication with the microprocessor, the radiofrequency component operating at 2.4 giga-Hertz, the power for the radiofrequency component drawn from the battery, the radiofrequency component only operable during a transmission mode, transmitting a signal from the radiofrequency component during the transmission mode, the signal comprising data related to the movement monitored by the multi-axis accelerometer;

wherein the device consumes less than 600 nano-amps during the sleep mode, the sleep mode having a time period ranging from 10 seconds to 30 seconds;

wherein the device consumes less than 15 micro-amps during the sampling mode;

wherein the device consumes less than 50 micro-amps during the analysis mode;

wherein the device consumes less than 200 micro-amps during the monitoring mode; and wherein the device consumes less than 12 milli-amps during the transmission mode.

2. The method according to claim 1 wherein the signal packet is sent from a device positioned within a grip of a golf club, the device comprising:

a housing composed of a polymer material, the housing having a main body;

a battery positioned within the housing;

a microprocessor positioned within the housing, the microprocessor in electrical communication with the battery;

a multi-axis accelerometer for determining movement, monitoring movement and communicating the movement to the microprocessor, the multi-axis accelerometer positioned within the housing, the multi-axis accelerometer in electrical communication with the microprocessor; and a radiofrequency component positioned within the housing, the radiofrequency component in electrical communication with the microprocessor, the radiofrequency component operating at 2.4 giga-Hertz, the radiofrequency component transmitting a signal comprising data related to the movement monitored by the multi-axis accelerometer.

3. The method according to claim 1 wherein the signal packet comprises an identification for a golf club.

4. The method according to claim 1 further comprising uploading the distance for the first shot of the golfer on a golfer's web page of a web site.

5. The method according to claim 1 further comprising determining a location of a GPS device for a golfer on a golf course for every shot of the golfer during a round of golf;

receiving a signal from a golf club of the golfer that the golf club struck a golf ball at a location for a shot of every shot of the golfer during the round of golf; and recording the location on the golf course, an identification of the golf club and a time that the golf club struck the golf ball at a location for a shot of every shot of the golfer during the round of golf.

6. The method according to claim 1 further comprising determining a time period between the golfer striking the golf ball at the first location and the golfer striking the golf ball at the second location.

7. The method according to claim 6 further comprising determining if the time period exceeds a time threshold for the time period.

8. The method according to claim 7 further comprising reassigning the distance of the first shot based on a distance for the second shot.

9. A system for tracking a golfer's round of golf, the system comprising:

a plurality of golf clubs, each of the plurality of golf clubs comprising a grip with an internal device, the grip attached to a shaft which is attached to a golf club head, the internal device comprising a power source positioned within a housing, means for determining impact, a microprocessor and a RFID component, wherein impact of a golf club of the plurality of golf clubs swung by the golfer activates the impact means to have the microprocessor transmit a signal packet from the RFID component for transmission, the signal packet comprising a type of golf club impacted, a backswing length, a downswing length, a backswing relative speed and a downswing relative speed, the power source comprising a battery, a resistor and a capacitor, the RFID component comprising a RFID transponder and a processor;

a GPS device for receiving the signal from the RFID component, wherein the GPS device stores data for each golf shot swung by the golfer for a round of golf, wherein the GPS device is configured to record the current location of the GPS device, an identification of the golf club used by the golfer for each golf shot and the time that the golf club was used to determine a distance for each golf shot based on a current location and a prior location of a prior golf shot, the GPS device also configured to store the backswing length, the downswing length, the backswing relative speed and the downswing relative speed for each shot swung by the golfer;

wherein the signal packet is sent from the internal device positioned with the grip of at least one of the plurality of golf clubs comprises:

the power source having no more than 225 milliamp hours of power;

the microprocessor in electrical communication with the power source, the microprocessor operating during a sleep mode, a sampling mode, an analysis mode, a monitoring mode and a transmission mode;

the microprocessor positioned within the housing, a multi-axis accelerometer for determining movement, monitoring movement and communicating the movement to the microprocessor, the multi-axis accelerometer positioned within the housing, the multi-axis accelerometer in electrical communication with the microprocessor, the power for the multi-axis accelerometer drawn from the power source, the multi-axis accelerometer only active during the sampling mode, the analysis mode and the monitoring mode;

the RFID component positioned within the housing, the RFID component in electrical communication with the microprocessor, the RFID component operating at 2.4 giga-Hertz, the power for the RFID component drawn from the power source, the RFID component only operable during the transmission mode, transmitting a signal from the RFID component during the transmission mode, the signal comprising data related to the movement monitored by the multi-axis accelerometer;

wherein the internal device consumes less than 600 nano-amps during the sleep mode, the sleep mode having a time period ranging from 10 seconds to 30 seconds;

wherein the internal device consumes less than 15 micro-amps during the sampling mode;

wherein the internal device consumes less than 50 micro-amps during the analysis mode;

wherein the internal device consumes less than 200 micro-amps during the monitoring mode; and wherein the internal device consumes less than 12 milli-amps during the transmission mode.

10. The system according to claim 9 further comprising a web page for the golfer, the web page at a web site, the golfer storing the round of golf on the web page.

11. The system according to claim 9 wherein impact means is an accelerometer.

12. The system according to claim 9 wherein impact means is a shock switch.

13. The system according to claim 9 wherein impact means is a multiple axis accelerometer.

* * * * *